United States Patent
Khatri et al.

(10) Patent No.: US 6,721,883 B1
(45) Date of Patent: Apr. 13, 2004

(54) SYSTEM AND METHOD FOR MANAGING THE BOOT ORDER OF A COMPUTER SYSTEM

(75) Inventors: Mukund P. Khatri, Austin, TX (US); Albert John Bolian, Round Rock, TX (US); George Mathew, Austin, TX (US); Wai-Ming Richard Chan, Austin, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/490,523

(22) Filed: Jan. 25, 2000

(51) Int. Cl.$^7$ ................................. G06F 1/24
(52) U.S. Cl. ..................... 713/2; 713/100; 710/16; 710/104
(58) Field of Search ............... 713/2, 100; 710/16, 710/104

(56) References Cited

U.S. PATENT DOCUMENTS

| | | | |
|---|---|---|---|
| 5,274,816 A | 12/1993 | Oka | 395/700 |
| 5,448,741 A | 9/1995 | Oka | 395/700 |
| 5,577,219 A | 11/1996 | Timko et al. | 395/411 |
| 5,696,968 A | 12/1997 | Merkin | 395/652 |
| 5,822,582 A | 10/1998 | Doragh et al. | 395/652 |
| 5,854,905 A | 12/1998 | Garney | 395/284 |
| 5,860,001 A | 1/1999 | Cromer et al. | 395/651 |
| 5,870,554 A | 2/1999 | Grossman et al. | 395/200.52 |
| 6,044,411 A * | 3/2000 | Berglund et al. | 710/9 |
| 6,101,559 A * | 8/2000 | Schultz et al. | 710/15 |
| 6,105,130 A * | 8/2000 | Wu et al. | 713/2 |
| 6,269,417 B1 * | 7/2001 | Mahalingam | 710/104 |
| 6,317,828 B1 * | 11/2001 | Nunn | 713/2 |
| 6,397,268 B1 * | 5/2002 | Cepulis | 710/8 |
| 6,401,140 B1 | 6/2002 | Wu | 710/10 |
| 6,513,114 B1 | 1/2003 | Wu et al. | 713/2 |

OTHER PUBLICATIONS

Compaq Computer Corporation, Phoenix Technologies Ltd., Intel Corporation, "BIOS Boot Specification", Version 1.01, Jan. 11, 1996.*

Compaq Computer Corporation, Technology Brief, "Where Do I Plug The Cable? Solving the Logical–Physical Slot Numbering Problem", Dec. 1996.*

"User Selectable Boot Process," IBM Technical Disclosure Bulletin http://www.patents.ibm.com/tdbs/tdbo?o=95A%2060141, Jan. 1995.

* cited by examiner

Primary Examiner—Thomas Lee
Assistant Examiner—Albert Wang
(74) Attorney, Agent, or Firm—Baker Botts L.L.P.

(57) ABSTRACT

A method and system for booting a computer system is provided in which the boot order of the computer system is displayed to the user in a manner such that the name of each bootable device and the location of each bootable device in the architecture of the computer system are displayed to the user upon entering a setup routine. The boot order displayed may also identify other information about the bootable devices of the computer system, including the operating and maximum speed of the devices and whether the devices are embedded devices. The boot order may be changed by the user by entering setup and manipulating the displayed list of bootable devices.

6 Claims, 3 Drawing Sheets

BOOT ORDER

| | BUS | DEVICE | FUNCTION | SLOT | ACTUAL/CAPABLE |
|---|---|---|---|---|---|
| 1. XYZ SCSI ADPT. | 1 | 1 | 0 | 1 | 33/66 |
| 2. ABC RAID ADPT. | 0 | 1 | 0 | 5 | 33/33 |
| 3. HARD DRIVE CTRLR. | 1 | 2 | 0 | 2 | 33/33 |
| 4. CD-ROM CTRLR. | 0 | 2 | 0 | 3 | 33/33 |
| 5. XYZ SCSI ADPT. | 0 | 3 | 0 | EMB | 33/33 |
| 6. DEF SCSI ADPT. | 0 | 4 | 0 | 4 | 33/33 |

BUS NO. 0: 33 MHz   BUS NO. 1: 66 MHz
BOOT ORDER MAY BE MODIFIED BY HIGHLIGHTING A SELECTION AND USING THE UP AND DOWN ARROW KEYS.

302

BOOT ORDER

| | BUS | DEVICE | FUNCTION | SLOT | ACTUAL/CAPABLE |
|---|---|---|---|---|---|
| 1. XYZ SCSI ADPT. | 1 | 1 | 0 | 1 | 33/66 |
| 2. ABC RAID ADPT. | 0 | 1 | 0 | 5 | 33/33 |
| 3. HARD DRIVE CTRLR. | 1 | 2 | 0 | 2 | 33/33 |
| 4. CD-ROM CTRLR. | 0 | 2 | 0 | 3 | 33/33 |
| 5. XYZ SCSI ADPT. | 0 | 3 | 0 | EMB | 33/33 |
| 6. DEF SCSI ADPT. | 0 | 4 | 0 | 4 | 33/33 |

BUS NO. 0: 33 MHz   BUS NO. 1: 66 MHz
BOOT ORDER MAY BE MODIFIED BY
HIGHLIGHTING A SELECTION AND USING
THE UP AND DOWN ARROW KEYS.

FIG.3

SYSTEM AND METHOD FOR MANAGING THE BOOT ORDER OF A COMPUTER SYSTEM

TECHNICAL FIELD OF THE INVENTION

The present disclosure relates generally to computer systems, and, more particularly, to a system and method for managing the boot order of a computer system.

BACKGROUND OF THE INVENTION

Computer systems, especially server systems, can be configured to boot from one of several available devices in the computer system. Modem computer systems permit a user to specify the boot device of the computer system. For example, the user of a computer system may instruct the computer system to boot from a specific hard drive, magnetic disk, CD-ROM or some other bootable device.

In the case of a computer system having one or more PCI buses, the computer system may boot from any one of the devices coupled to any of the PCI buses of the computer system. In computer systems having multiple PCI buses, the PCI buses are numbered. The first PCI bus is numbered 0 and the remaining PCI buses are numbered sequentially from 0. For each PCI bus, each device coupled to the PCI bus is uniquely numbered. Thus, each device that is coupled to a PCI bus may be identified by its PCI bus number and device number. As an example, the first device on the first PCI bus can be identified as device 0 on PCI bus 0. The second device on the first PCI bus can be identified as device 1 on PCI bus 0, and so on.

In prior computer systems, the boot order of the computer systems was determined by the computer system's scan order. The computer system scanned the PCI devices of the computer system, starting with the PCI bus and device having the lowest number. Thus, the computer system would first attempt to boot from device 0 on PCI bus 0. If the computer system determined that it could not boot from device 0 on PCI bus 0, the computer system would continue its scan for a bootable device at device 1 of PCI bus 0. Alternatively, the direction of the boot scan could be reversed so that the boot scan would begin at the highest numbered PCI bus and device. If the user wished to boot from a particular device, the user had to physically install the device in the appropriate device slot so that the device would be the first bootable device encountered during the boot scan. This method of specifying the boot device was disadvantageous in that it required the physical manipulation of the bootable devices as a means of specifying the boot order.

More recent methods of specifying the boot order in a computer system having involved methods in which the user was permitted to manipulate the boot order by entering a BIOS system setup routine during start-up of the computer system. At startup of the computer system, a boot order routine in the ROM BIOS of the computer system typically presents for the user a list of bootable devices. The user could then choose among the list of bootable devices identified in the table to specify the boot order of the computer system. This method permitted the user to specify the boot order regardless of the location of the device in the computer system. This method, however, leads to a trial and error approach of selecting a bootable device for booting when multiple identical bootable devices are present in the computer system.

SUMMARY OF THE INVENTION

In accordance with the present disclosure, disclosed system and method for booting a computer system and determining the boot order of a computer system provides significant advantages over current computer system boot management techniques.

The boot order system and method of the present disclosure involves the display in a setup routine of the boot order of the computer system. The bootable devices of the computer system are identified by their name and by their location in the computer system. Because each bootable device is identified by both its name and its location in the computer system, each bootable device is uniquely identified, even in the case where there are multiple identical bootable devices in the computer system. In those systems in which the bootable devices are PCI devices, the PCI devices are identified in the boot order listing by the name of the PCI device, the PCI bus number, and the PCI slot number of the bootable device. The boot order list may also contain an identification of whether the PCI device is an embedded device and the operating speed and maximum speed of the PCI device.

A technical advantage of the boot order system and method is a boot order technique in which the computer user can positively identify bootable devices in those instances in which the computer system includes multiples of the same bootable device. Because each bootable device is positively identified, the computer user can change the boot order of the computer system without resorting to a trial and error approach for identifying the content of the bootable devices of the computer system.

Another technical advantage of the boot order system and method is that the boot order display will identify embedded PCI devices. Identifying embedded devices assists the computer user in identifying those devices that may be detached from the computer system and later reinstalled or replaced. Another technical advantage of the disclosed boot order system and method is the display of the actual operating speed of the bootable PCI devices, as well as the rated speed of the PCI devices, and the maximum operating speed of the PCI buses of the computer. Identifying the operating speed of the bootable devices allows the user to determine if a slower device has been installed or is slated to be installed on a faster bus, thereby causing a potential degradation in the performance of the computer system.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a representation of the display screen of a setup routine of a computer system.

DETAILED DESCRIPTION OF THE INVENTION

Figure 1:
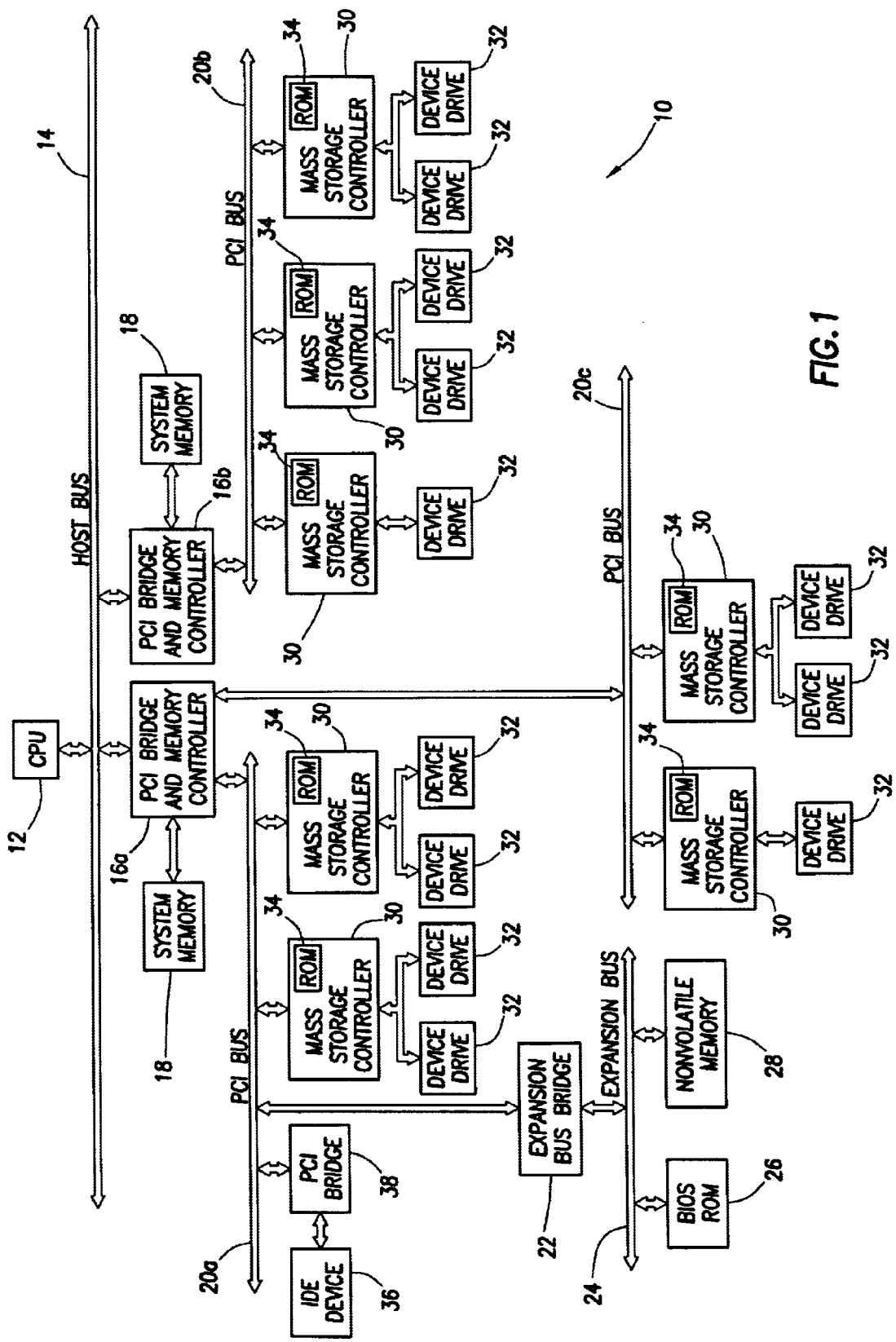
FIG. 1 is a diagram of the architecture of a computer system.

The present disclosure concerns a method and system for managing the boot order of bootable devices of a computer system, including both personal computer and server systems. The method and system described is especially applicable in those instances in which similar bootable devices are located in separate locations in the computer system, such as when the computer system includes multiples of the same bootable device on a single PCI bus or in the case when the computer system includes multiple PCI buses, each having the same bootable device installed in a slot on each PCI bus. Shown in FIG. 1 is a schematic block diagram of a computer system, which is indicated generally at 10. Computer system 10 includes a central processing unit (CPU) 12, which is coupled to a host bus 14. Coupled to host bus 14 are memory controller and PCI bridges 16a and 16b, each of which is coupled to system memory 18. Each of the PCI bridges 16a and 16b is coupled to a PCI bus. PCI bridge 16a is coupled to PCI buses 20a and 20c, and PCI bridge 16b is coupled to PCI bus 20b. Coupled to PCI bus 20a is an expansion bus bridge 22, which is coupled to expansion bus 24. As is common in modern computer systems, expansion bus 24 may be an ISA bus, and expansion bridge 22 may be a PCI/ISA bridge. As an alternative, expansion bus 24 and expansion bridge 22 may operate according to another suitable expansion bus standard. Coupled to expansion bus 24 are a BIOS ROM 26 and a nonvolatile memory 28. Nonvolatile memory 28 may be an NVRAM or a CMOS memory. Also coupled to PCI bus 20a is a PCI bridge 36, which operates as a IDE controller, which is in turn coupled to IDE drive 38.

In the computer system 10 of FIG. 1, PCI bus 20a operates at 33 MHz, and PCI bus 20c operates at 66 MHz. Coupled to PCI bus 20a are mass storage controllers 30, and coupled to each of mass storage controllers 30 are device drives 32. Mass storage controllers 30 may include SCSI controllers, RAID controllers, or any other memory controller that manages the stored memory of a PCI device. Each mass storage controller 30 includes an option ROM 34 that features BIOS extension code for configuring device drives 32. As shown on FIG. 1, mass storage controllers 30 may manage multiple bootable device drives 32. As an alternative, mass storage controller 30 may manage a single bootable device 32. PCI bridge 16b is coupled to a single PCI bus 20 and associated mass storage controllers 30 and device drives 32. The PCI buses and the PCI devices on each bus are numbered sequentially. The PCI buses are numbered from 0. Each physical PCI slot is associated with a PCI device number. The PCI device numbers of each PCI bus are sequential, beginning with 1, with the number 0 typically being reserved for the PCI bridge. The physical PCI slots are numbered sequentially from 1. As an example, ROM BIOS 26 may recognize PCI bus 20a as PCI bus 0. The first mass storage controller 30 on PCI bus 20a may be recognized by ROM BIOS 26 as the PCI device 1 occupying slot 1 on PCI bus 0.

In operation, the option ROM BIOS 34 of each mass storage controller may be queried by the BIOS during setup in order to identify the mass storage controller. As an example, a mass storage controller may identify itself, following a query by the ROM BIOS, as an "XYZ Co. Model 001 SCSI Controller." The system and method of the present disclosure permits the user to control the boot order of the bootable devices of the system by associating, as part of the setup program, the name of the mass storage controller with the location of the mass storage controller among the PCI buses and PCI slots of the computer system.

Figure 2:
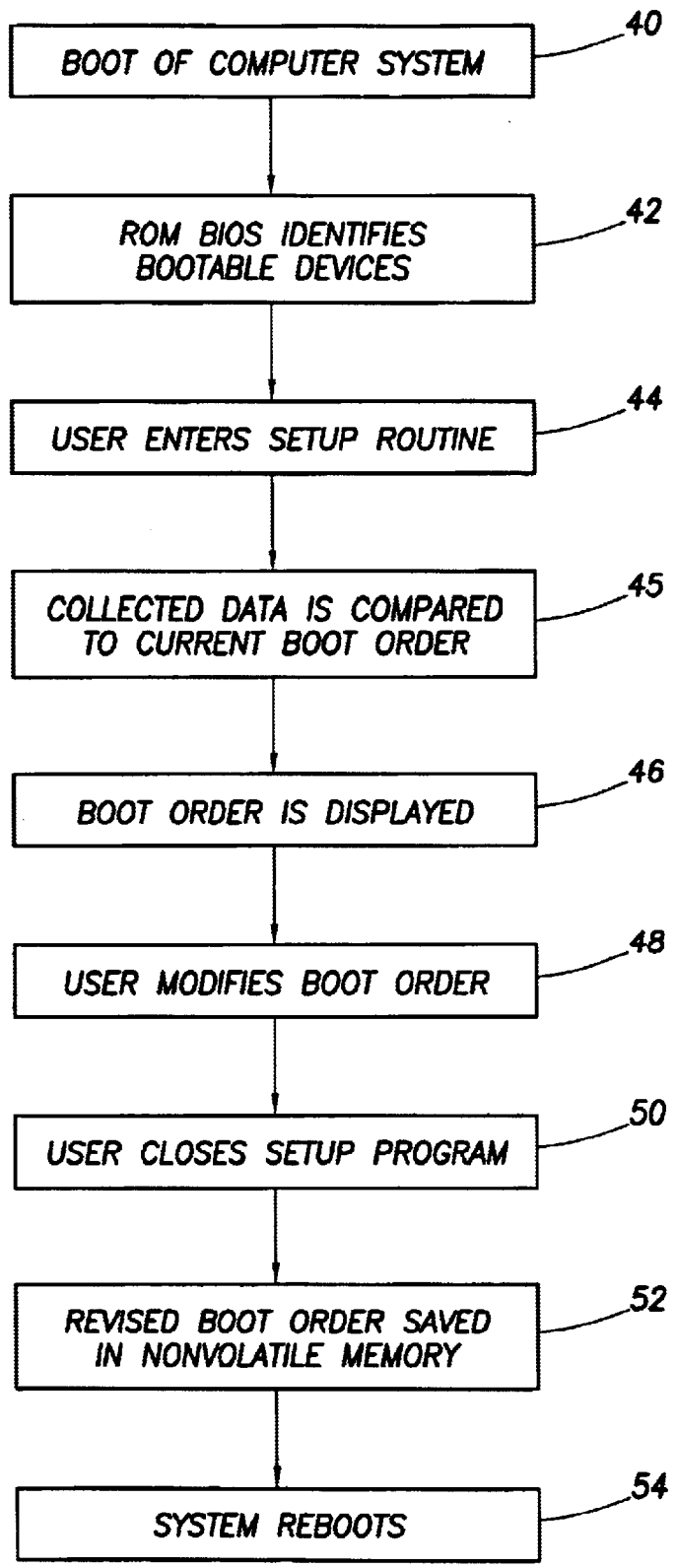
FIG. 2 is a flow diagram of the process of changing the boot order of a computer system.

FIG. 2 is a flow diagram of the process for selecting the boot order of the computer system according to the presently disclosed system and method. First, to enter the setup program, the user of the computer system must reboot the computer system at step 40. The boot of the computer system causes the computer to perform the computer system's initialization routines and to load the computer system's operating system. Upon initialization, at step 42 the ROM BIOS 26 of the computer system identifies the components of the computer system, including an identification of the PCI buses and PCI devices of the computer system. ROM BIOS 26 reads the header information of each bootable device. The header information of each bootable device is typically stored in the option ROM of the bootable device and identifies the name of the device. The computer system will also associate each bootable device with its PCI device number, physical PCI slot, and operating speed. The identity of the bootable devices of the computer system is saved in memory.

The initialization routines of the computer system include the option to enter the computer system's BIOS setup routine. As part of the setup routine, the user can change the boot order of the computer system. The user of the computer system has the option of entering the setup program at each boot of the computer system. After the computer system scans its memory and performs other basic housekeeping checks, and prior to the initialization of the operating system, the user may be presented with following instructions: "PRESS F2 TO START SETUP." At step 44, the user presses F2 and enters the computer system's setup routine. Shown in FIG. 3 is a representation of the screen 302 that is presented by the boot order setup routine. The current boot order of the computer system is stored in nonvolatile memory 28, which is accessed by the boot order routine. The data that was collected in step 42 for each of the bootable devices of the computer system is stored in memory by the ROM BIOS at startup in the event the computer user enters the setup routine. If the user enters the setup routine, the setup routine at step 45 compares the collected data to the current boot order. At step 46, the computer system displays the current boot order of the computer system. If bootable devices are identified in step 42 that are not listed in the current boot order, these devices are displayed at step 46 at the end of the boot order list of screen 302. If a bootable device is listed in the current boot order, but was not located as part of the identification of bootable devices in step 42, the unlocated device is not displayed at step 46 in the boot order list of screen 302.

The boot order screen 302 of FIG. 3 displays the current boot order of the computer system. In the example of FIG. 1, the boot order begins with the XYZ Co. SCSI Adapter located at PCI Bus No. 1 and PCI Slot No. 1, and ends with DEF Co. SCSI Adapter located at PCI Bus No. 0 and PCI Slot No. 4. In operation, the computer system will attempt to boot from the devices in the order listed in the stored boot order. The boot order listing of boot order screen 302 contains information in addition to a listing of the names of the bootable devices. For each device in the boot order listing, the column PCI Bus No. identifies the number of the PCI bus of the device. The column PCI Device No. identifies the PCI device number of each bootable device, and the column PCI Slot No. identifies the physical PCI slot number of each bootable device. As such, the boot order listing of boot order screen 302 identifies the name and physical location of each bootable device of the computer system. The name of each PCI device is read from the header of each device, and the PCI bus number, PCI device number, and PCI slot number are determined by the ROM BIOS.

In the boot order screen 302 of FIG. 3, the first listed XYZ Co. SCSI Adapter and the hard drive controller are located on physical PCI slots 1 and 2, respectively, of PCI bus 1. Other of the listed bootable devices—the ABC Co. Raid Adapter, the CD ROM controller, and the DEF Co. SCSI Adapter—are located on slots 5, 3, and 4, respectively, of PCI bus 0. The listing of bootable devices on the boot order screen identifies both the boot order of the listed devices, as well as the location of the bootable devices in the computer system. In those cases where two bootable devices are identical, and therefore have identical names, the bootable devices can be positively identified by their location in the computer system. The physical PCI slots of the computer system will be physically labeled with their PCI slot number, allowing the computer user to identify visually the bootable devices by opening the computer case. Even in those cases where the computer system includes identical bootable devices, the computer user will be able to accurately identify and manipulate the boot order of those devices by reading the boot order screen and visually inspecting the PCI slots of the computer system, which is labeled with the physical PCI slot number of each slot. The identification of the location of each bootable device in the boot order screen allows the computer user to select among duplicate bootable devices in a computer system. It should be recognized that even though the bootable devices of the list of screen 302 are shown as being present on only two PCI buses, bootable devices may be present on any of several PCI buses, depending on the number of PCI buses in the computer architecture of the computer system.

In addition to identifying each bootable device by its PCI bus number and PCI slot number, the boot order screen 302 also identifies each bootable device by its PCI function. Under the PCI function column, the numeric code for the PCI function of each bootable device is listed. For single function PCI devices, the function number is typically 0. For multi-function PCI devices the function number may be a number from a range of suitable function numbers (0, 1, 2, . . . ). The boot order list of screen 302 also identifies in the PCI Slot No. column those PCI devices that are embedded. Embedded devices are not detachable from the computer system and are designated "Emb" in the PCI Slot No. column of the boot order screen. This designation alerts the computer user to those devices that are not detachable from the computer system. Identifying detachable bootable devices is useful to the computer user because it allows the computer user to recognize and locate the devices that may be replaced for subsequent boots of the computer system. The identification of embedded and non-embedded devices is aid to the computer user because it identifies for the computer user those devices that may and may not be removed from the computer system. If the computer user wishes to insert a bootable device in the computer system, and, by so doing, replace an existing bootable device, the notation "Emb" in the boot order screen would identify for the computer user those device that are and are not detachable. The second listed XYZ Co. SCSI Adapter in the boot order listing of screen 302 is identified as being an embedded device.

The boot order listing of screen 302 also identifies the operating speed of each bootable device and the maximum or rated speed of each bootable device. The lower half of screen 302 identifies the maximum operating speed of each PCI bus. At present, PCI buses may operate at 66 MHz or 33 MHz. Although a PCI bus may be configured to operate at 66 MHz, the bus will nevertheless operate at 33 MHz if a 33 MHz PCI device is installed in any slot on the bus. The column Actual/Capable on the boot order listing of screen 302 informs the computer user of the actual operating speed and the highest capable operating speed of each bootable device. The identification of the actual operating speed of each PCI device as compared to its rated speed may alert the user to limitations in the performance of the computer system that may be caused by the installation of a 33 MHz PCI device in a PCI bus capable of operating at 66 MHz. For example, in the boot order listing of screen 302, because PCI bus 1 can operate at 66 MHz. The installation of the 33 MHz hard drive controller in PCI bus 1 causes PCI bus 1 to operate at 33 MHz, limiting the performance of the PCI bus and of the other devices installed on the PCI bus. As shown in the boot screen, because of the installation of a slower hard driver controller in PCI bus 1, the first listed XYZ Co. SCSI Adapter is operating at 33 MHz, even though it has a rated speed of 66 MHz and is installed in a PCI bus capable of operating at 66 MHz. The first listed XYZ Co. SCSI Adapter cannot run at 66 MHz because a slower hard driver controller has been installed on the same PCI bus. The display of the operating speeds of the PCI buses and the operating speeds of the PCI devices alerts the user to limitations in the performance of the computer system. Identifying the speed of the PCI buses is also critical for the hot adding of PCI devices in those cases when the computer user has a choice of available PCI slots for the addition of the PCI device. The speed of the PCI device and the identification of embedded versus nonembedded PCI devices is determined by the ROM BIOS.

At step 48, the user is given the opportunity to modify the boot order of the computer system. This is accomplished on the screen 302 by highlighting bootable device and then using the up arrow or down arrow keys of the computer system to move the device up or down in the boot order. As an example, to move a bootable device lower in the boot order, the user would highlight the bootable device, using either a pointing device or a keyboard, and then use the down arrow key to move the device until the device had reached its desired position in the boot order. Once the user has adjusted the boot order of the bootable devices, the user closes the setup program at step 50. At step 52, the computer system saves the new boot order in nonvolatile memory. At step 54, the computer system reboots according to the newly saved boot order.

In those instances when the identified bootable device is a mass storage controller coupled to multiple device drives, the option ROM of the mass storage controller determines the boot order among the multiple device drives coupled to the mass storage controller. As an example, assuming that a mass storage controller is coupled to multiple device drives, the option ROM of the mass storage controller may specify that when the mass storage controller is selected to boot the computer system, the mass storage controller attempts to boot the system from each of the device drives coupled to the mass storage controller, according to a boot order specified by the option ROM of the mass storage controller.

The system and method for managing the boot order of a computer system of the present disclosure permits the user to more easily determine or modify the current boot order. If the user wishes to boot the computer system to run one of Windows 98, Windows NT, or Linux, the system and method of the present disclosure allows the user to more easily switch among bootable devices without resorting to a trial and error approach for determining the boot order of the present system and for booting the system to one of several operating systems stored in system hardware. The user can easily associate a particular bootable device to a particular operating system, even in those instances in which different operating systems, Windows NT and Linux, for example, are installed in identical bootable devices. The system and method is particularly useful in those instances in which the computer system includes multiple bootable devices that have the same or similar device names. A computer system adopting the system and method described herein will identify each of the similar devices by its unique location in the computer architecture, permitting the user to visually identify the bootable device after opening the case to the computer system. The system and method described herein will also identify each bootable device by its PCI function, operating speed, capable speed, and its status as an embedded or non-embedded device. The identification of bootable devices by reference to their status as embedded or non-embedded devices assists the user in determining removable or replaceable bootable devices. The identification of bootable devices by their operating speed and capable speed assists the computer user in determining whether slower devices are installed on buses in the computer system having faster operating speeds.

Although the present disclosure has been described in detail, it should be understood that various changes, substitutions, and alterations can be made hereto without departing from the spirit and the scope of the invention as defined by the appended claims.

What is claimed is:

1. A computer system, comprising:

a plurality of PCI bootable devices, each PCI bootable device storing identification data; and a BIOS, including a setup routine capable of accessing the stored identification data or the bootable PCI devices and displaying a list of bootable PCI devices in the computer system according to the boot order of the computer system, the list of bootable PCI devices including an identification of the location of each bootable PCI device in the architecture of the computer system such that each bootable PCI device is uniquely identified in the displayed boot order;

wherein the identification of each PCI device includes an identification of the operating speed of the device.

2. The computer system of claim 1, wherein the identification of each PCI device includes an identification of the maximum operating speed of the device.

3. A method for displaying the boot order of a computer system, comprising the steps of:

identifying each bootable PCI device in the computer system;

reading identification data stored on each bootable PCI device in the computer system; and displaying, following a request from the computer user, the boot order of the computer system, wherein the bootable PCI devices in the boot order are identified by their name and location in the architecture of the computer system such that each bootable PCI device is uniquely identified in the displayed boot order;

wherein the display of bootable PCI devices includes the display of the operating speed of each PCI device.

4. The method for displaying the boot order of a computer system of claim 3, wherein the display of bootable PCI devices includes the display of the maximum speed of each PCI device.

5. A method for modifying the boot order of a computer system, comprising the steps of:

initiating a boot order modification routine upon command from the user of the computer system;

reading from memory the current boot order of the computer system;

displaying the current boot order of the system, the displayed boot order identifying each bootable PCI device by its name and its location in the architecture of the computer system such that each bootable PCI device of the computer system is uniquely identified; and changing the boot order of the displayed list of bootable PCI devices according to instructions received from the user;

wherein the display of bootable PCI devices includes the display of the speed of each bootable device.

6. The method for modifying the boot order of a computer system of claim 5, wherein the display of bootable PCI devices includes the display of the operating speed and maximum speed of each bootable device.

* * * * *